United States Patent
Pourzandi et al.

(10) Patent No.: US 8,385,551 B2
(45) Date of Patent: Feb. 26, 2013

(54) HIGHLY AVAILABLE CRYPTOGRAPHIC KEY STORAGE (HACKS)

(75) Inventors: Makan Pourzandi, Montreal (CA); András Méhes, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1567 days.

(21) Appl. No.: 11/615,364

(22) Filed: Dec. 22, 2006

(65) Prior Publication Data

US 2008/0152151 A1    Jun. 26, 2008

(51) Int. Cl.
*H04L 9/00*      (2006.01)
*G06F 15/16*    (2006.01)
*H04L 9/32*      (2006.01)

(52) U.S. Cl. ............... 380/277; 726/2; 726/3; 726/6; 726/34; 713/165; 713/171; 713/193; 713/194; 709/208; 709/220; 709/221; 709/223

(58) Field of Classification Search ............ 380/277; 713/171; 709/208
See application file for complete search history.

(56) References Cited

U.S. PATENT DOCUMENTS

| | | | |
|---|---|---|---|
| 6,697,823 B2 * | 2/2004 | Otsuka et al. .................. 1/1 |
| 6,751,748 B1 * | 6/2004 | Bush ............................. 714/4 |
| 7,281,010 B2 * | 10/2007 | Challener ...................... 1/1 |
| 7,382,880 B2 * | 6/2008 | Angelo et al. ................. 380/259 |
| 2002/0059286 A1 * | 5/2002 | Challener ..................... 707/100 |
| 2002/0188763 A1 | 12/2002 | Griffin |
| 2003/0065861 A1 | 4/2003 | Clark et al. |
| 2004/0198372 A1 * | 10/2004 | Auterinen .................... 455/453 |
| 2004/0236958 A1 | 11/2004 | Teicher et al. |
| 2005/0137889 A1 * | 6/2005 | Wheeler ........................ 705/1 |
| 2005/0163317 A1 * | 7/2005 | Angelo et al. ................. 380/259 |
| 2005/0235141 A1 | 10/2005 | Ibrahim et al. |
| 2006/0026422 A1 * | 2/2006 | Bade et al. .................... 713/164 |
| 2006/0117177 A1 * | 6/2006 | Buer ............................. 713/155 |
| 2006/0259782 A1 * | 11/2006 | Wang et al. ................... 713/189 |
| 2007/0003064 A1 * | 1/2007 | Wiseman et al. ............. 380/281 |
| 2007/0038856 A1 * | 2/2007 | Ali et al. ....................... 713/164 |
| 2007/0079120 A1 * | 4/2007 | Bade et al. .................... 713/166 |
| 2007/0094493 A1 * | 4/2007 | Ali et al. ....................... 713/156 |
| 2007/0168048 A1 * | 7/2007 | Allen et al. ................... 700/2 |
| 2008/0077808 A1 * | 3/2008 | Teicher et al. ................ 713/193 |
| 2008/0091934 A1 * | 4/2008 | Peterson et al. .............. 713/2 |
| 2008/0235804 A1 * | 9/2008 | Bade et al. .................... 726/26 |

(Continued)

OTHER PUBLICATIONS

TCG, 2005, Interoperability Specification for Backup and Migration Services, pp. 1-50.*

(Continued)

*Primary Examiner* — Christian LaForgia
*Assistant Examiner* — Jenise Jackson (57) ABSTRACT

A system and method for managing trusted platform module (TPM) keys utilized in a cluster of computing nodes. A cluster-level management unit communicates with a local TPM agent in each node in the cluster. The cluster-level management unit has access to a database of protection groups, wherein each protection group comprises one active node which creates a TPM key and at least one standby node which stores a backup copy of the TPM key for the active node. The local TPM agent in the active node automatically initiates a migration process for automatically migrating the backup copy of the TPM key to the at least one standby node. The system maintains coherency of the TPM keys by also deleting the backup copy of the TPM key in the standby node when the key is deleted by the active node.

16 Claims, 6 Drawing Sheets

U.S. PATENT DOCUMENTS

2008/0282348 A1* 11/2008 Proudler et al. ................ 726/22
2009/0249073 A1* 10/2009 Wiseman et al. ............ 713/171
2009/0328145 A1* 12/2009 Berger et al. ..................... 726/3

OTHER PUBLICATIONS

International Search Report for PCT/IB2007/055293 dated Jun. 30, 2008.

Ajay Kamalvanshi et al.: "Using OpenAIS for Building Highly Available Session Initiation Protocol (SIP) Registrar" Service Availability Lecture Notes in Computer Science; LNCS, Springer Berlin Heidelberg, BE, vol. 4328, Jan. 1, 2006, pp. 217-228, XP019053149.

Schneier, Bruce Ed: "Basic Protocols", Applied Cryptography Protocols, Algorithms, and Source Code in C, New York, John Wiley & Sons, US, Jan. 1, 1996, pp. 47-74 & pp. 169-187, XP002973152.

* cited by examiner

HIGHLY AVAILABLE CRYPTOGRAPHIC KEY STORAGE (HACKS)

TECHNICAL FIELD

This invention relates to data processing systems. More particularly, and not by way of limitation, the invention is directed to an apparatus and method for storing, retrieving, and backing up cryptographic keys utilizing Trusted Platform Modules (TPMs) in highly available computing clusters.

BACKGROUND

Most data processing systems contain sensitive data and sensitive operations that need to be protected. The data and operations need to be protected from illegitimate modification and disclosure, and the data processing systems need to be able to reliably identify themselves to other data processing systems. An operator of a given data processing system may employ hardware security mechanisms such as security tokens and biometric sensor devices, and may also employ software security mechanisms such as various authentication and authorization schemes to protect the data processing systems.

The essence of data processing security is trust. A data processing system should accept data and operations from another system only if the other system can establish a level of trust with respect to particular data items or particular operations. Thus, the ability to protect a data processing system is limited by the manner in which trust is created within the data processing system.

To address the issues of protecting data processing systems, a consortium of companies has formed the Trusted Computing Group (TCG) to develop and to promulgate open standards and specifications for trusted computing. According to TCG specifications, trust within a given data processing system or trust between a data processing system and another entity is based on a hardware or software component within the data processing system that has been termed the Trusted Platform Module (TPM).

A TPM enables an entity to determine the state of the software environment in the TPM and to seal data to a particular software environment in the TPM. The entity deduces whether the state of the computing environment in the TPM is acceptable before performing a transaction with the TPM. To enable this, the TPM provides to the entity, integrity metrics (also known as integrity measurements) that reflect the integrity of the software state of the TPM. The integrity measurements require a root of trust within the computing platform. In order for a system to be a TPM, the integrity measurements must be taken from the Core Root of Trust for Measurements and must extend through the Initial Program Load (IPL) process up to the point at which the operating system is initialized.

A single hardware TPM is designed to provide support for a single, non-partitionable computer system. Thus, existing systems utilize a single hardware TPM to provide trust for an entire single system. A problem arises when a single hardware TPM providing trust for an entire system fails to perform properly. When the single hardware TPM malfunctions, services can be severally damaged or impacted in the system until the malfunctioning hardware TPM is serviced or replaced. In some instances, no trust services can be provided in the system. An additional problem arises regarding the provision of trust support for multiple computer systems when configured to operate together, for example, as a highly available cluster. TCG specifications support only the manual migration of cryptographic keys from one platform to another on a case-by-case basis. Highly available clusters have special needs for robust distributed processing, coordination, replication, failover, and the like not specified in TCG specifications.

It would be advantageous to have a system, method, and computing node which overcomes the disadvantages of the prior art. The present invention provides such a system, method, and computing node.

SUMMARY

In one embodiment, the present invention provides a framework in which TPM keys are backed up in standby processors in such a way that the backup TPM keys can be found when needed without any service interruption. Each TPM key is automatically backed up whenever TPM hardware in one of the nodes of the cluster creates a new key. The TPM keys may be stored according to different redundancy models such as 2N, N+M, and N-Way redundancy models. The invention supports transparent access to all of the TPM keys created in the cluster with TPM hardware. The keys can be used anywhere in the cluster as long as these keys have been created as migratable TPM keys. The invention is particularly well suited to high-availability clusters because the invention provides support for transparent access to the backup TPM keys by the standby process in the case of active node/process failure.

It should be noted that the backup TPM keys may be utilized to distribute the processing load among different nodes. For example, Key K1 (created on Node-X) may be backed up in a limited number of nodes or in all nodes of the cluster. Each node may load the backup copies of Key K1 to the node's local Trusted Software Stack (TSS). Then, applications can use the local backup copies of Key K1 without any need to access Node-X. In larger clusters, the use of such "cluster-wide keys" may be limited.

In one aspect, the present invention is directed to a method of managing TPM keys utilized in a cluster of computing nodes. The method includes establishing a protection group comprising at least two nodes within the cluster; creating a TPM key within an active node in the protection group; and automatically creating a backup copy of the TPM key in at least one standby node in the protection group according to a predefined redundancy model.

In another aspect, the present invention is directed to a trusted node in a cluster of computing nodes. The node includes TPM hardware for creating and storing a TPM key; a local TPM agent for automatically sending a copy of the TPM key to at least one standby node which stores the backup copy of the TPM key for the trusted node; and an interface unit for receiving from an application process, a request to access the TPM key, said interface unit determining whether to obtain the TPM key from the TPM hardware or to obtain the backup copy of the TPM key through the local TPM agent.

In another aspect, the present invention is directed to a system for managing TPM keys utilized in a cluster of computing nodes. The system includes a local TPM agent in each node in the cluster, and a cluster-level management unit in communication with the local TPM agents. The cluster-level management unit has access to a database of protection groups, wherein each protection group comprises at least one active node which creates a TPM key and at least one standby node which stores a backup TPM key for the active node. The local TPM agent in the active node includes means for automatically initiating a migration process for automatically sending a backup copy of the TPM key to the at least one standby node in the active node's protection group according to a predefined redundancy model. The system maintains coherency of the TPM keys by also deleting the backup copy of the TPM key in the standby node when the key is deleted by the active node.

BRIEF DESCRIPTION OF THE DRAWINGS

In the following, the essential features of the invention will be described in detail by showing preferred embodiments, with reference to the attached figures in which.

DETAILED DESCRIPTION

The present invention is referred to herein utilizing the acronym HACKS (Highly Available Cryptographic Key Storage). The invention provides highly available, distributed key storage for highly available computing clusters utilizing hardware TPMs. The functions performed by the present invention may be illustrated through the following scenarios.

In a first scenario, an original process uses a hardware TPM on Node-X to create keys, seal data, and so on. If Node-X fails, causing the original process to fail, the service must be switched to a backup process on another node. The backup process must have access to the keys previously created by the original process using the hardware TPM on Node-X. These keys may be necessary, for example, for decrypting data previously encrypted by the original process before failure, and the like. The HACKS infrastructure provides keys to the backup process in a transparent way.

In one embodiment, upon creation of the key by the hardware TPM in Node-X, the original process also migrates its key to the backup process (or at least to the node running the backup process). In this solution, the original process needs to know which process is the backup process, and needs to be able to migrate its key upon creation. In a preferred embodiment, however, this functionality is moved from the application level to the level of the infrastructure of the highly available cluster. In practice, the original process may not always know which process is the backup process. In a dynamic HA environment, depending on the redundancy model used, the backup process may vary over time, and the original process cannot predict which process will be the backup process at failure time. Furthermore, when the backup process is implemented at the HA infrastructure level, both the original process and the backup process are provided with transparent access to keys regardless of where the keys are actually backed up.

As described herein, a node is considered to be the "active node" for all the (migratable) keys the node creates. For each active node, a "protection group" is defined as an active node and the set of nodes that hold backup copies of the keys created by the active node. The nodes in the protection group which hold backup keys are referred to as "standby nodes". A group of nodes in a cluster that operates under the same redundancy model is referred to as a "redundancy group". It should be noted that a redundancy group may consist of multiple, sometimes overlapping, protection groups, and that nodes may serve both as active and standby nodes (although in different protection groups) at the same time.

For purposes of the description herein, three different redundancy models are distinguished: 2N, N+M, and N-way. In the 2N redundancy model, the redundancy group has 2N nodes partitioned into N protection groups with two nodes each: one active and one standby. Consequently, there are N active nodes and N standby nodes in a one-to-one correspondence between active and standby nodes. In the N+M redundancy model, the redundancy group has N active nodes and M standby nodes, for a total of N+M nodes, but in this case the M standby nodes act as a standby for each active node. That is to say, there are N protection groups, one for each active node, with the same M standby nodes in each protection group. In the N-way redundancy model, the redundancy group has just N nodes, all of them active nodes for their own keys and standby for all the other active nodes. This translates into N protection groups, one for each node, with the rest of the N−1 nodes in the protection group acting as standby nodes for that node.

Figure 1:
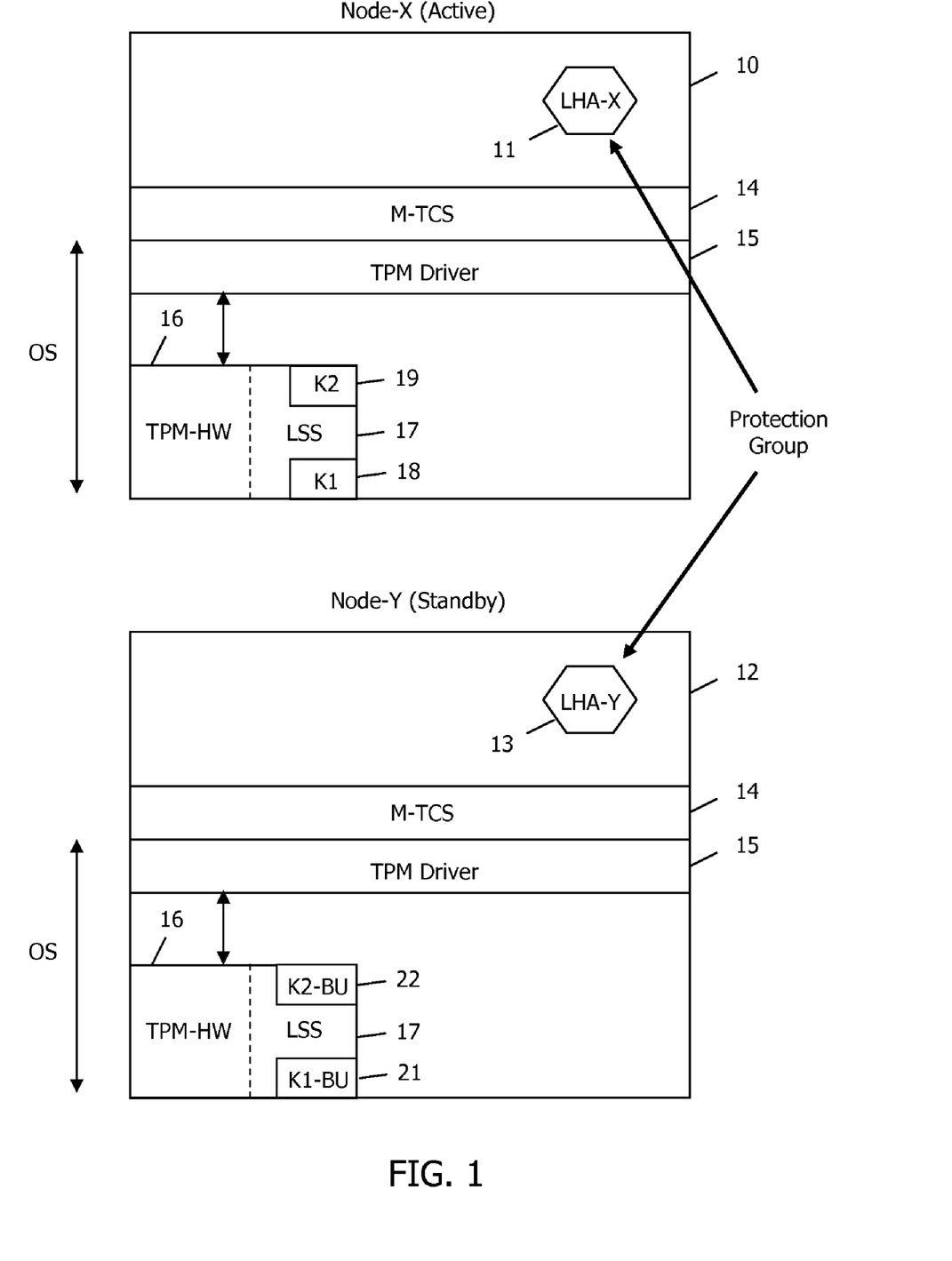
FIG. 1 is a simplified block diagram illustrating two exemplary nodes in a high-availability computing cluster based on a 2N redundancy model.

FIG. 1 is a simplified block diagram illustrating two exemplary nodes in a high-availability computing cluster based on a 2N redundancy model in which Node-X 10 is an active node and Node-Y 12 is a standby node. Node-X includes a Local HACKS Agent (LHA-X) 11, and Node-Y includes LHA-Y 13. Together, LHA-X and LHA-Y form a protection group. Each node also includes a Modified Trusted Software Stack (TSS) Core Service (M-TCS) 14, a TPM driver 15, TPM hardware (TPM-HW) 16, and Local Secure Storage (LSS) 17 for locally storing the TPM keys and copies of the other node's TPM keys. The LSS may be secured using TPM functionality, but this is optional, and the LSS may be secured in other ways in other implementations.

The TPM-HW 16 in Node-X 10 creates and deletes TPM keys such as K1 18 and K2 19, as directed by the M-TCS 14. Since Node-X and Node-Y are in a 2N redundancy model, standby Node-Y backs up the keys from active Node-X. Thus, Node-Y is shown to store a backup copy of K1 (K1-BU) 21 and a backup copy of K2 (K2-BU) 22.

Figure 2:
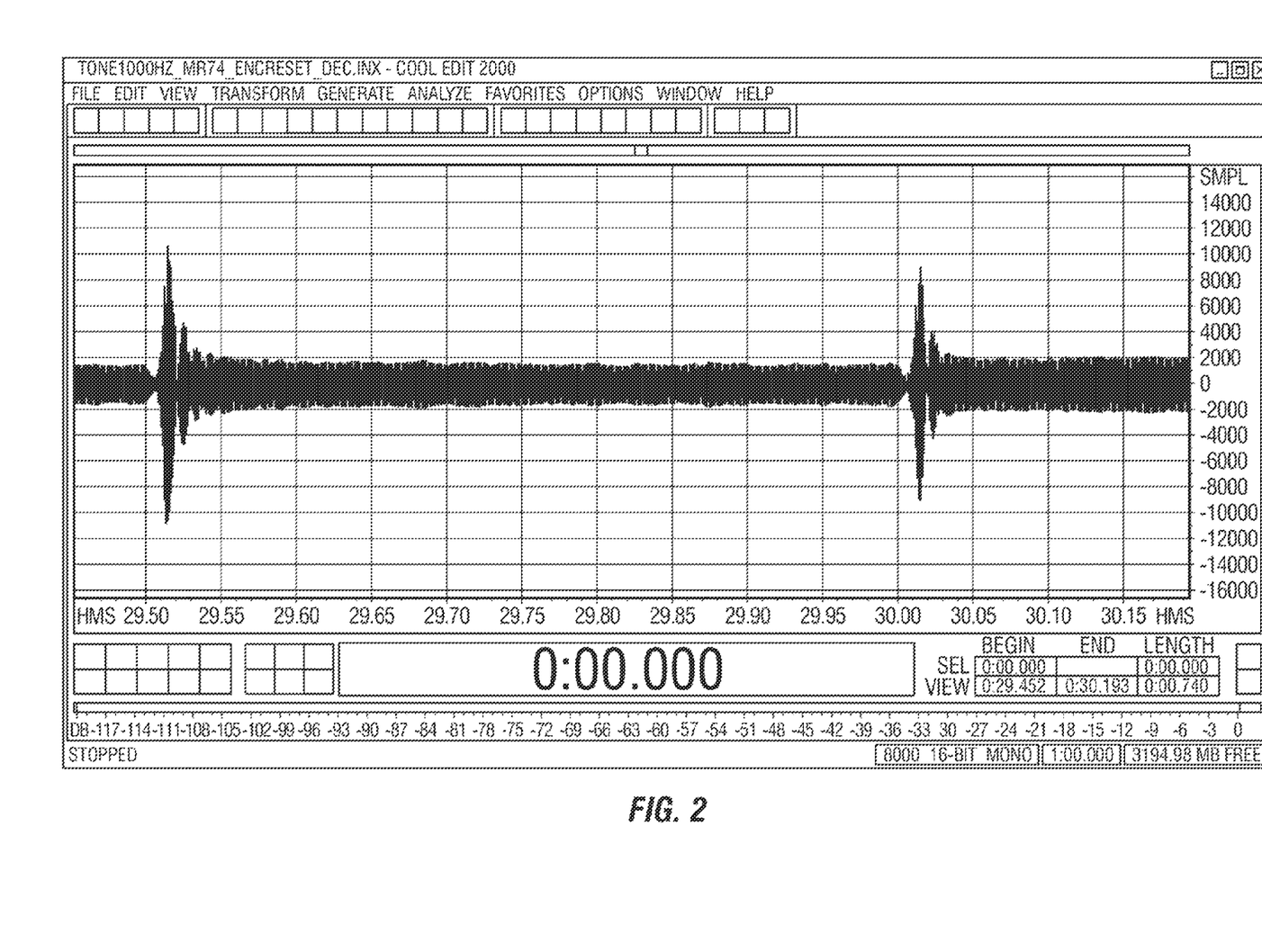
FIG. 2 is a simplified block diagram illustrating two exemplary nodes in a high-availability computing cluster based on an N-Way redundancy model.

FIG. 2 is a simplified block diagram illustrating two exemplary nodes in a high-availability computing cluster based on an N-way redundancy model in which Node-X 10 and Node-Y 12 are both active, and each node is also a standby node for the other node. A HACKS Management Unit (HMU) 23 is a logical entity, which keeps a list of all protection groups and their node members, and provides the list to each LHA 11, 13. The HMU is a cluster-level management unit, which may be implemented in a centralized location, or may be distributed throughout the cluster. Although only one HMU is illustrated in FIG. 2, it should be understood that several instances of the HMU may exist in order to provide high availability, for example, in clusters with a large number of nodes. The HMU maintains the coherency of the protection group list among the different LHAs by reflecting changes or updates in protection groups. The HMU monitors the key migrations between different nodes in protection groups. In case of an anomaly, the HMU modifies the members of protection groups to keep an adequate level of redundancy. For example, if Nodes A, B, and C are in a protection group with N-way redundancy, and Node-C crashes, the HMU may add another node such as Node-D to the protection group to take the place of Node-C.

As an example of the functioning of the protection group, an original process A-X 24 in Node-X 10 is backed up by a backup process A-Y 25 in Node-Y. The original process A-X uses the TPM-HW 16 to create the TPM key K1 18. Key K1 is copied and stored in Node-Y 12 as key K1-BU 21. If the original process A-X on Node-X crashes, an HA system management environment (not shown) switches control to the backup process A-Y in Node-Y, which then becomes active. The new active process attempts to access at 26 the backup copy K1-BU to create information. The process is automated, without any manual intervention.

In the preferred embodiment, there is one LHA per node in the cluster. The communications between different LHAs and the HMU are secured for confidentiality and integrity. The nodes are all part of the trusted platform. Each LHA backs up its local keys. Each LHA utilizes TPM migration mechanisms to migrate keys from its local node to remote nodes in its protection group. Each LHA also manages and provides access to local backup keys (i.e., keys backed up by the LHA's local node for other nodes in its protection group). This is done through the reception of migration packages (MPs) as defined in "Interoperability specifications for backup and migration services, Specifications 1.0," https://www.trustedcomputinggroup.org/groups/infrastructure/IWG_Backup_and_Migration_Services.pdf, which is incorporated herein by reference. The LHA provides any LHA in the cluster with the backup keys locally stored.

When a local LHA receives a request from a remote LHA for a key for which the local LHA holds an MP, the local LHA sends the MP to the remote LHA. When an LHA receives MPs from other nodes, the LHA processes the MPs and registers the keys with the local TSS in order for the local application to be able to use the keys through the TSS. In the case of protection group related activities, when regular backups are received from other nodes in the protection group, the LHA may not register these MPs to the TSS as soon as they are received, because doing so may create a large number of key registrations with TSS even though the keys are not used (and will not be needed until a node crashes, which is rather rare). This may result in memory/resource overload in a system with hundreds of nodes. To avoid this, the LHA preferably stores MPs in its LSS 17. When the HMU 23 informs the LHA of a node failure, the LHA loads the corresponding MPs to the local TSS.

Figure 3:
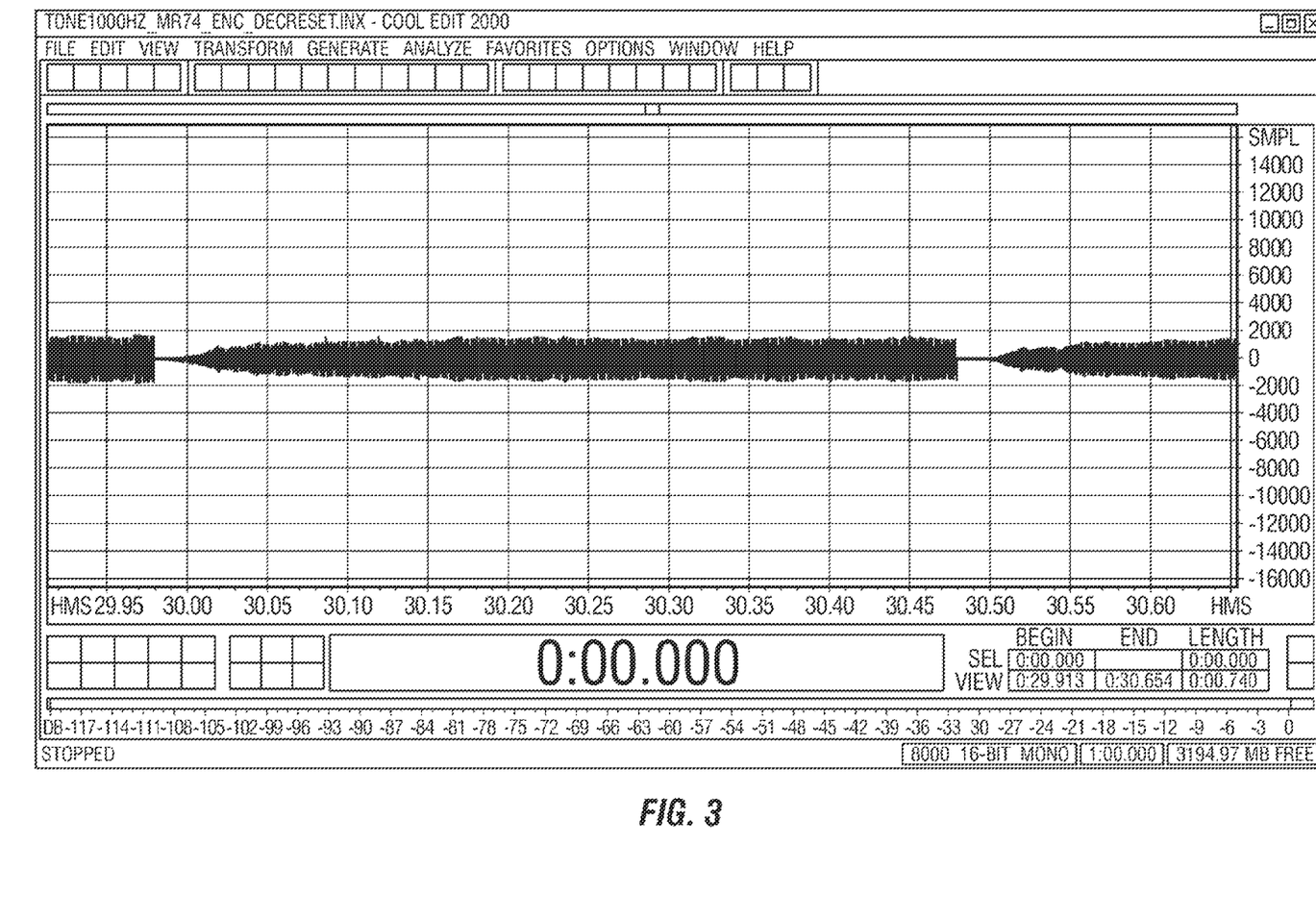
FIG. 3 is a simplified block diagram of an exemplary node illustrating a function of the Modified TSS Core Service (M-TCS)

FIG. 3 is a simplified block diagram of an exemplary node 31 illustrating a function of the Modified TSS Core Service (M-TCS) 14. The M-TCS is a modification of the TSS "Core key and certificate service". The M-TCS is modified to detect requests for keys managed by HACKS, and serves as an interface unit between application processes, the node's TPM-HW 16, and the node's LHA 34. When the M-TCS receives a request 32 to read key K1 18, the M-TCS determines at 33 whether a requested key is managed by HACKS, and only sends requests for keys managed by HACKS to the LHA 34. The first time a key is requested, M-TCS re-directs the request to the LHA. After being loaded to TSS, the keys are locally cached for further use. This also avoids sending requests for non-existent keys, or sending erroneous or misdirected requests to the LHA. Upon receiving an answer from the LHA, the M-TCS returns the key to the requesting process 35.

In the preferred embodiment, the keys from a particular node or process are backed up as a node-level set in a standby node. In this embodiment, the keys are not backed up on an individual basis in different nodes. In other words, the granularity of the key storage process is controlled at the node level. All of the keys created using the TPM-HW 16 in a given node are backed up as a set in designated standby nodes within the given node's protection group. This approach keeps the key management complexity at a manageable level even in large high-availability clusters with hundreds of nodes and possibly hundreds of keys per node (e.g., even if the number of keys is high or is as high as without this approach). To illustrate this point, if there are multiple keys K1, K2, . . . Kn on Node-A, then HACKS backs up all these keys as a unique set in cluster nodes according to the redundancy model. Individual keys from Node-A are not stored in different nodes. The node granularity simplifies the entire process of keeping track of different keys. In an alternative embodiment, the keys are backed up on an individual basis in standby nodes.

Figure 4:
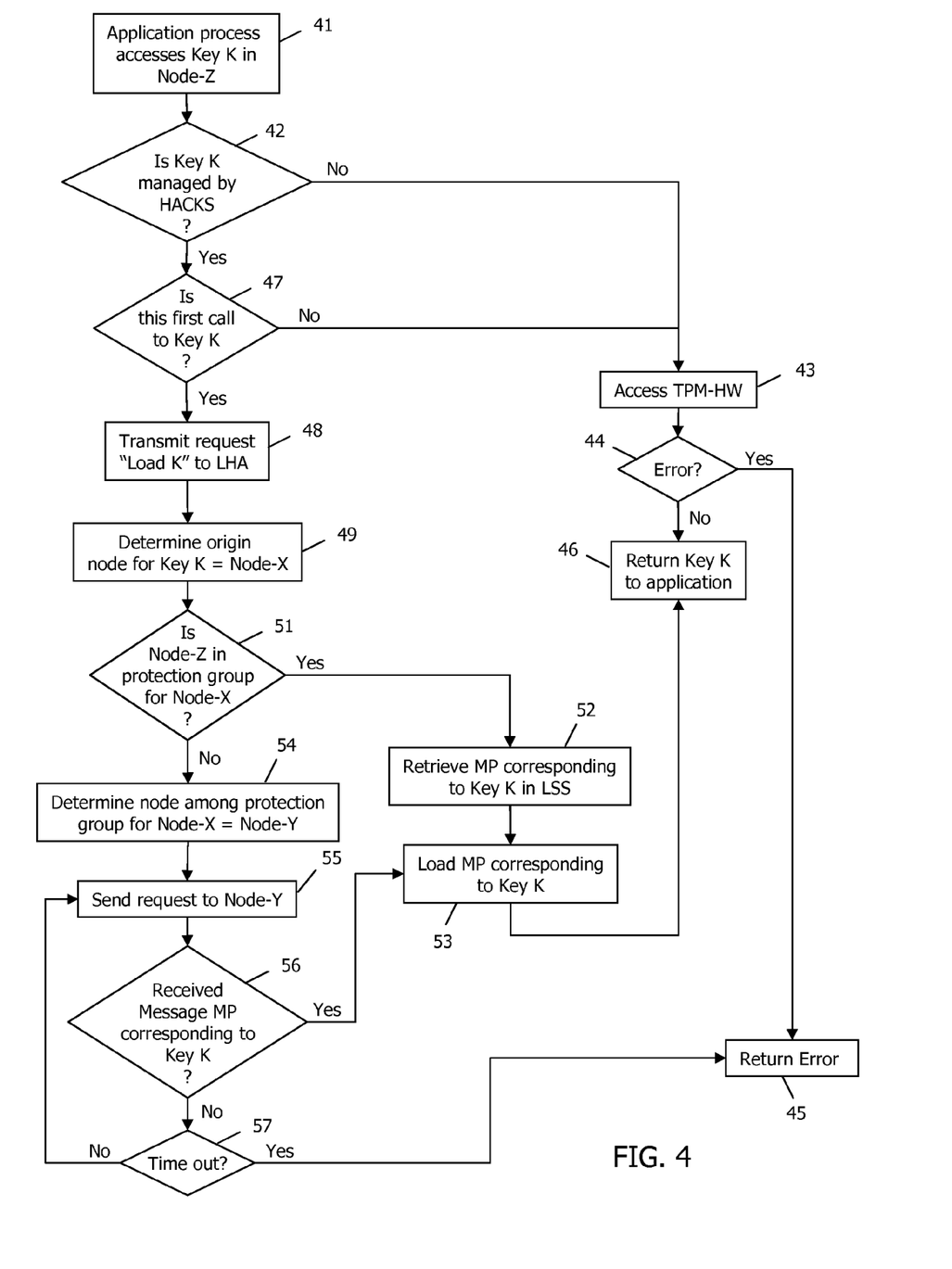
FIG. 4 is a flow chart of an exemplary method of finding a key on another node.

FIG. 4 is a flow chart of an exemplary method of finding a key on another node. At step 41, an application process accesses key K in Node-Z. At step 42, the M-TCS 14 in Node-Z determines whether Key K is managed by HACKS. If not, the method moves to step 43 where Node-Z accesses its TPM-HW 16 to obtain Key K. At step 44, it is determined whether there is an error. For example, Key K may not be stored in Node-Z. If there is an error, the method moves to step 45 and returns an error message to the application process. If there is no error, the method moves to step 46 where Key K is returned to the application process.

If it is determined at step 42 that Key K is managed by HACKS, the method moves to step 47 where it is determined if this is the first call to Key K. If not, then Key K is locally cached. Therefore, the process again moves to step 43 where Node-Z accesses its TPM-HW 16 to obtain Key K. If there is no error, Key K is then returned to the application process. However, if it is determined at step 47 that this is the first call to Key K, the method moves to step 48 where the M-TCS 14 in Node-Z transmits the request "Load K" to Node-Z's LHA (LHA-Z). At step 49, the LHA-Z determines the origin node where Key K was created. In the illustrated case, Key K was created in Node-X 10.

At step 51, Node-Z determines from LHA-Z whether it is in the protection group for Node-X 10. If so, the method moves to step 52 where the migration package (MP) corresponding to Key K is retrieved in the LSS 17. At step 53, the MP corresponding to Key K is loaded. The method then moves to step 46 where Key K is returned to the application process. However, if Node-Z determines at step 51 that it is not in the protection group for Node-X, the method moves to step 54 where Node-Z utilizes LHA-Z to determine a node among the protection group for Node-X. In the illustrated case, Node-Z determines that Node-Y is among the protection group for Node-X. At step 55, Node-Z sends a request for Key K to Node-Y. At step 56, Node-Z determines whether it has received from Node-Y, a message MP corresponding to Key K. If not, it is determined at step 57 whether the retrieval process has timed out. If not, the method returns to step 55 and repeats the request to Node-Y. If the retrieval process has timed out, an error is returned at step 45 to the application process. However, if Node-Z has received a message MP corresponding to Key K at step 56, the method moves to step 53 where the MP corresponding to Key K is loaded. The method then moves to step 46 where Key K is returned to the application process.

Figure 5:
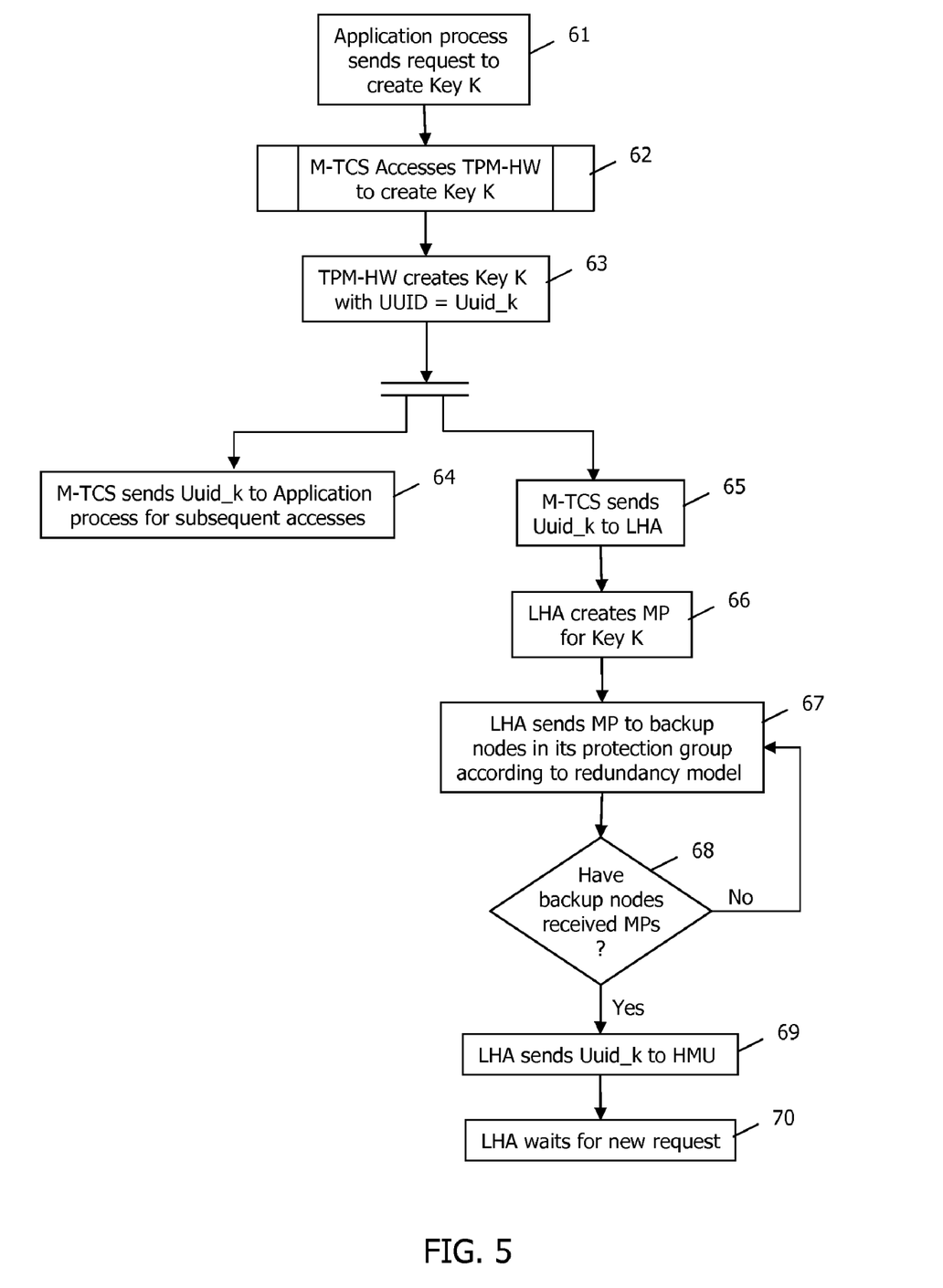
FIG. 5 is a flow chart of an exemplary method of creating a TPM key.

FIG. 5 is a flow chart of an exemplary method of creating a TPM key. When a key is created in a node, the M-TCS notifies the node's LHA. The M-TCS sends the key's Unified Unique Identity (UUID) and the key's public key to the LHA. When the LHA receives the notifications, it begins a backup process to migrate the newly created key to the nodes in the protection group defined as backup nodes according to the pre-defined redundancy model. Note that backups are not created for non-migratable keys. Concurrently, the LHA propagates the UUID and public key to other LHAs in the cluster. This enables the other LHAs to identify the remote keys and the node of origin in order to find their backups. At the same time, this information is necessary to validate a request for deleting a key, under the condition that only the application creating a key can delete that key.

At step 61, an application process sends a request to the M-TCS 14 to create Key K. At step 62, the M-TCS accesses the TPM-HW 16 to create Key K. At step 63, the TPM-HW creates Key K with UUID=Uuid_k. At step 64, the application process receives the Uuid_k for subsequent accesses. In parallel, the M-TCS sends the Uuid_k to the LHA at step 65. At step 66, the LHA creates the MP for Key K. At step 67, the LHA sends the MP to backup nodes in the LHA's protection group according to the predefined redundancy model. At step 68, it is determined whether all of the backup nodes have received the MPs. If not, the method returns to step 67 where the LHA continues to send the MP to backup nodes in the LHA's protection group. If all of the backup nodes have received the MPs, the method moves to step 69 where the LHA sends the Uuid_k to the HMU 21. At step 70, the LHA then waits for a new request.

In an alternative embodiment, rather than the LHA sending the MP directly to the backup nodes in the LHA's protection group, the LHA may send the MP to the HMU 21. The HMU then sends the MP to the backup nodes in the LHA's protection group according to the predefined redundancy model. In this embodiment, the HMU includes a database function identifying the nodes in each protection group. The HMU also includes control and management functions which ensure that upon creation, keys are backed up in the proper backup nodes.

Figure 6:
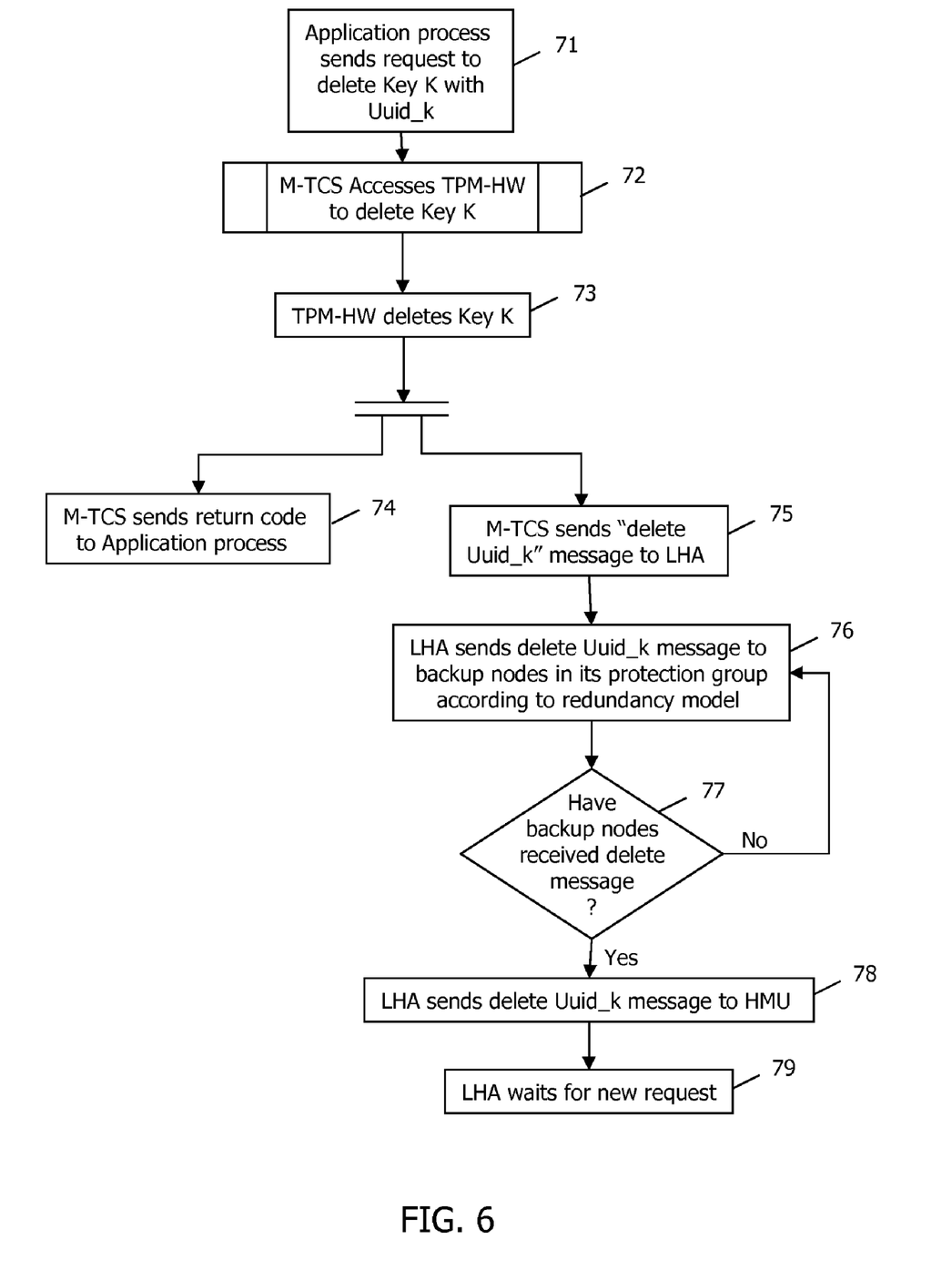
FIG. 6 is a flow chart of an exemplary method of deleting a TPM key.

FIG. 6 is a flow chart of an exemplary method of deleting a TPM key. When a key is deleted in a node, the M-TCS 14 notifies the node's LHA. The LHA propagates this information to all LHAs in the protection group and to the HMU. Alternatively, the LHA may notify the HMU, and the HMU then notifies all LHAs in the protection group. It is noted that a direct connection between the LHAs spread the deletion notification as fast as possible to all nodes in the cluster. All LHAs and the HMU then remove the references to the key in their local cache.

At step 71, an application process sends a request to the M-TCS 14 to delete Key K having Uuid_k. At step 72, the M-TCS accesses the TPM-HW 16 to delete Key K. At step 73, the TPM-HW deletes Key K with Uuid_k. At step 74, the application process receives a return code indicating the deletion of the key. In parallel, the M-TCS sends a "delete Uuid_k" message to the LHA at step 75. At step 76, the LHA sends the delete Uuid_k message to backup nodes in the LHA's protection group according to the predefined redundancy model. At step 77, it is determined whether all of the backup nodes have received the delete message. If not, the method returns to step 76 where the LHA continues to send the delete message to the backup nodes in the LHA's protection group. If all of the backup nodes have received the delete message, the method moves to step 78 where the LHA sends the delete Uuid_k message to the HMU 21. At step 79, the LHA then waits for a new request.

Alternatively, the LHA may send the delete Uuid_k message to the HMU 21. The HMU then sends the delete Uuid_k message to the backup nodes in the LHA's protection group according to the predefined redundancy model.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

The invention claimed is:

1. A computer-implemented method of managing trusted platform module (TPM) keys utilized in a cluster of computing nodes, said method comprising:
 establishing a protection group comprising at least two nodes within the cluster, wherein a first node is an active node and at least one other node is a standby node;
 creating a TPM key within the active node in the protection group;
 automatically migrating a backup copy of the TPM key to the at least one standby node in the protection group;
 receiving, at a node in the cluster, a request from an application process to access a TPM key;
 determining, at the receiving node, that the requested TPM key is not stored within the receiving node;
 determining that the receiving node is not within the node of origin's protection group; requesting a migration package corresponding to the requested TPM key from a node identified within the node of origin's protection group node; and
 returning the requested TPM key to the application process.

2. The method according to claim 1, wherein the protection group is part of a redundancy group established according to a predefined redundancy model, wherein the predefined redundancy model is a 2N redundancy model and the step of automatically migrating the backup copy of the TPM key to the at least one standby node in the protection group includes migrating the backup copy of the TPM key to a single standby node.

3. The method according to claim 1, wherein the protection group is part of a redundancy group established according to a predefined redundancy model, wherein the predefined redundancy model is an N+M redundancy model in which there are N active nodes creating TPM keys and M standby nodes backing up the TPM keys, wherein the step of automatically migrating the backup copy of the TPM key to the at least one standby node in the protection group includes migrating the backup copy of the TPM key from one of the N active nodes to the M standby nodes.

4. The method according to claim 1, wherein the protection group is part of a redundancy group established according to a predefined redundancy model, wherein the predefined redundancy model is an N-way redundancy model in which all of the nodes in the cluster are active, and each node in the cluster backs up all of the other nodes in the cluster, wherein the step of automatically migrating the backup copy of the TPM key to at least one standby node in the protection group includes migrating the backup TPM keys from each of the active nodes to every other node in the redundancy group.

5. The method according to claim 1, wherein the step of creating a TPM key within an active node in the protection group includes:
 receiving in the active node, a request from an application process to create the TPM key;
 creating the TPM key utilizing the active node's TPM hardware;
 assigning the TPM key a unique identifier; and returning the unique identifier to the requesting application process.

6. The method according to claim 5, wherein the step of automatically migrating the copy of the TPM key to at least one standby node includes:
   creating a migration package in a local agent in the active node, said migration package including, the unique identifier for the TPM key; and
   sending the migration package directly from the local agent to the at least one standby node in the protection group.

7. The method according to claim 5, wherein the step of automatically migrating the copy of the TPM key to at least one standby node includes:
   creating a migration package in a local agent in the active node, said migration package including the unique identifier for the TPM key; and
   sending the migration package from the local agent to a cluster-level management unit;
   identifying by the cluster-level management unit, the at least one standby node in the protection group; and
   forwarding the migration package from the cluster-level management unit to the identified at least one standby node.

8. The method according to claim 5, further comprising:
   receiving from the application process, a request to delete the TPM key;
   deleting the TPM key by the TPM hardware; and
   sending a delete message to the at least one standby node instructing the at least one standby node to delete the backup copy of the TPM key.

9. The method according to claim 1, wherein the step of creating a TPM key within the active node is repeated to create a plurality of TPM keys, and the step of automatically migrating includes automatically migrating backup copies of the plurality of TPM keys as a node-level set to the at least one standby node in the protection group.

10. A trusted node in a cluster of computing nodes, said node comprising:
    a trusted platform module (TPM) hardware unit for creating and storing a TPM key utilized in the cluster;
    a local TPM agent for automatically migrating a backup copy of the TPM key to at least one standby node, which stores the backup copy of the TPM key for the trusted node and for creating a migration package for the TPM key and sending the migration package to a cluster-level management unit for forwarding to the at least one standby node; and
    an interface unit for receiving from an application process, a request to access the TPM key, said interface unit determining whether to obtain the TPM key from the TPM hardware or to obtain the backup copy of the TPM key through the local TPM agent.

11. The trusted node according to claim 10, wherein the interface unit also includes means for receiving from the application process, a request to delete the TPM key, wherein the interface unit instructs the TPM hardware to delete the TPM key and instructs the local TPM agent to send a delete message to the at least one standby node instructing the at least one standby node to delete the backup copy of the TPM key.

12. A system for managing trusted platform module (TPM) keys utilized in a cluster of computing nodes, said system comprising:
    a local TPM agent in each node in the cluster
    a cluster-level management unit in communication with the local TPM agents, said cluster-level management unit having access to a database of protection groups, wherein each protection group comprises one active node which creates a TPM key, and at least one standby node which stores a backup copy of the TPM key for the active node; and
    wherein the local TPM agent in the active node includes means for automatically initiating a migration process for automatically migrating the backup copy of the TPM key to the at least one standby node in the active node's protection group, the migration process including the creation of a migration package for the TPM key and sending the migration package to the cluster level management unit for forwarding to at least one standby node.

13. The system according to claim 12, further comprising in a receiving node which receives a request from an application process to access a TPM key:
    local secure storage for storing TPM keys; and
    an interface unit for determining whether the requested TPM key is stored within the receiving node's local secure storage, wherein if the requested TPM key is stored within the receiving node's local secure storage, the interface unit is adapted to return the requested TPM key to the application process, and if the requested TPM key is not stored within the receiving node's local secure storage, the interface unit is adapted to request a backup copy of the requested TPM key through the receiving node's local TPM agent.

14. The system according to claim 13, wherein the local TPM agent in the receiving node includes means for obtaining the backup copy of the requested TPM key when requested by the interface unit, said means for obtaining the backup copy of the requested TPM key including:
    means for determining a node of origin for the TPM key;
    means for determining whether the receiving node is within the node of origin's protection group;
    means responsive to a determination that the receiving node is within the node of origin's protection group, for loading a migration package corresponding to the requested TPM key; and
    means responsive to a determination that the receiving node is not within the node of origin's protection group, for identifying a node within the node of origin's protection group, for requesting a migration package corresponding to the requested TPM key from the identified node, and for loading the migration package corresponding to the requested TPM key.

15. The system according to claim 13, wherein the interface unit also includes means for receiving from the application process, a request to delete the TPM key, wherein the interface instructs TPM hardware in the receiving node to delete the TPM key and instructs the local TPM agent in the receiving node to send a delete message to the at least one standby node instructing the at least one standby node to delete the backup copy of the TPM key.

16. The system according to claim 13, wherein the local TPM agent sends the delete message to the cluster-level management unit for forwarding to the at least one standby node.

* * * * *

UNITED STATES PATENT AND TRADEMARK OFFICE
CERTIFICATE OF CORRECTION

| | | |
|---|---|---|
| PATENT NO. | : 8,385,551 B2 | Page 1 of 4 |
| APPLICATION NO. | : 11/615364 | |
| DATED | : February 26, 2013 | |
| INVENTOR(S) | : Pourzandi et al. | |

It is certified that error appears in the above-identified patent and that said Letters Patent is hereby corrected as shown below:

Delete the title page and substitute the attached title page therefor.

In the Drawings

Delete Sheet 2 of drawings and substitute the attached Sheet 2 therefor.

Delete Sheet 3 of drawings and substitute the attached Sheet 3 therefor.

In the Specifications

In Column 7, Line 25, delete "HMU 21." and insert -- HMU 23. --, therefor at each occurrence throughout the specification.

In the Claims

In Column 9, Line 7, in Claim 6, delete "including," and insert -- including --, therefor.

In Column 10, Line 4, in Claim 12, delete "cluster" and insert -- cluster; --, therefor.

Signed and Sealed this
Twenty-second Day of April, 2014

Michelle K. Lee
*Deputy Director of the United States Patent and Trademark Office*

(12) United States Patent
Pourzandi et al.

(10) Patent No.: US 8,385,551 B2
(45) Date of Patent: Feb. 26, 2013

(54) HIGHLY AVAILABLE CRYPTOGRAPHIC KEY STORAGE (HACKS)

(75) Inventors: Makan Pourzandi, Montreal (CA); András Méhes, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1567 days.

(21) Appl. No.: 11/615,364

(22) Filed: Dec. 22, 2006

(65) Prior Publication Data
US 2008/0152151 A1 Jun. 26, 2008

(51) Int. Cl.
*H04L 9/00* (2006.01)
*G06F 15/16* (2006.01)
*H04L 9/32* (2006.01)

(52) U.S. Cl. ............ 380/277; 726/2; 726/3; 726/6; 726/34; 713/165; 713/171; 713/193; 713/194; 709/208; 709/220; 709/221; 709/223

(58) Field of Classification Search ............ 380/277; 713/171; 709/208
See application file for complete search history.

(56) References Cited

U.S. PATENT DOCUMENTS

| | | | |
|---|---|---|---|
| 6,697,823 B2 * | 2/2004 | Otsuka et al. | 1/1 |
| 6,751,748 B1 * | 6/2004 | Bush | 714/4 |
| 7,281,010 B2 * | 10/2007 | Challener | 1/1 |
| 7,382,880 B2 * | 6/2008 | Angelo et al. | 380/259 |
| 2002/0059286 A1 * | 5/2002 | Challener | 707/100 |
| 2002/0188763 A1 | 12/2002 | Griffin | |
| 2003/0065861 A1 | 4/2003 | Clark et al. | |
| 2004/0198372 A1 * | 10/2004 | Auterinen | 455/453 |
| 2004/0236958 A1 | 11/2004 | Teicher et al. | |
| 2005/0137889 A1 * | 6/2005 | Wheeler | 705/1 |
| 2005/0163317 A1 * | 7/2005 | Angelo et al. | 380/259 |
| 2005/0235141 A1 | 10/2005 | Ibrahim et al. | |
| 2006/0026422 A1 * | 2/2006 | Bade et al. | 713/164 |
| 2006/0117177 A1 * | 6/2006 | Buer | 713/155 |
| 2006/0259782 A1 * | 11/2006 | Wang et al. | 713/189 |
| 2007/0003064 A1 * | 1/2007 | Wiseman et al. | 380/281 |
| 2007/0038856 A1 * | 2/2007 | Ali et al. | 713/164 |
| 2007/0079120 A1 * | 4/2007 | Bade et al. | 713/166 |
| 2007/0094493 A1 * | 4/2007 | Ali et al. | 713/156 |
| 2007/0168048 A1 * | 7/2007 | Allen et al. | 700/2 |
| 2008/0077808 A1 * | 3/2008 | Teicher et al. | 713/193 |
| 2008/0091934 A1 * | 4/2008 | Peterson et al. | 713/2 |
| 2008/0235804 A1 * | 9/2008 | Bade et al. | 726/26 |

(Continued)

OTHER PUBLICATIONS

TCG, 2005, Interoperability Specification for Backup and Migration Services, pp. 1-50.*

(Continued)

*Primary Examiner* — Christian LaForgia
*Assistant Examiner* — Jenise Jackson (57) ABSTRACT

A system and method for managing trusted platform module (TPM) keys utilized in a cluster of computing nodes. A cluster-level management unit communicates with a local TPM agent in each node in the cluster. The cluster-level management unit has access to a database of protection groups, wherein each protection group comprises one active node which creates a TPM key and at least one standby node which stores a backup copy of the TPM key for the active node. The local TPM agent in the active node automatically initiates a migration process for automatically migrating the backup copy of the TPM key to the at least one standby node. The system maintains coherency of the TPM keys by also deleting the backup copy of the TPM key in the standby node when the key is deleted by the active node.

16 Claims, 6 Drawing Sheets

FIG. 2

FIG. 3